(12) United States Patent (10) Patent No.: US 11,581,124 B2
Covic et al. (45) Date of Patent: Feb. 14, 2023

(54) MULTIPLE COIL FLUX PAD

(71) Applicant: Auckland Uniservices Limited, Auckland (NZ)

(72) Inventors: Grant Anthony Covic, Auckland (NZ); John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 16/921,039

(22) Filed: Jul. 6, 2020

(65) Prior Publication Data

US 2020/0366132 A1 Nov. 19, 2020

Related U.S. Application Data

(63) Continuation of application No. 14/379,068, filed as application No. PCT/NZ2013/000016 on Feb. 15, 2013, now abandoned.

(30) Foreign Application Priority Data

Feb. 16, 2012 (NZ) ....................... 598253

(51) Int. Cl.
*H02J 50/00* (2016.01)
*H01F 27/28* (2006.01)
*H02J 50/10* (2016.01)
*H01F 38/14* (2006.01)
*H02J 50/90* (2016.01)
*H02J 50/12* (2016.01)
*H02J 50/40* (2016.01)
(Continued)

(52) U.S. Cl.
CPC ....... *H01F 27/288* (2013.01); *H01F 27/2871* (2013.01); *H01F 38/14* (2013.01); *H02J 50/10* (2016.02); *H02J 50/12* (2016.02); *H02J 50/40* (2016.02); *H02J 50/90* (2016.02); *H02J 7/0044* (2013.01); *H02J 50/70* (2016.02); *H02J 2310/48* (2020.01)

(58) Field of Classification Search
CPC .................................. H02J 50/00; H04B 5/00
See application file for complete search history.

(56) References Cited

U.S. PATENT DOCUMENTS 6,407,470 B1 6/2002 Seelig
6,650,213 B1 11/2003 Sakurai
7,576,514 B2 8/2009 Hui
(Continued)

FOREIGN PATENT DOCUMENTS

EP 2597748 A2 5/2013
JP 2011229360 A 11/2011
(Continued)

OTHER PUBLICATIONS

European Application Serial No. 13749300.3, Extended European Search Report dated Aug. 26, 2015, 9 pages.
(Continued)

*Primary Examiner* — Adi Amrany
(74) *Attorney, Agent, or Firm* — Edell, Shapiro & Finnan, LLC

(57) ABSTRACT

The present invention provides a multi-coil inductive power transfer primary comprising a plurality of coil. A power transfer regime is selected based on a determined load on each of the plurality of coils.

20 Claims, 11 Drawing Sheets

Figure 1:
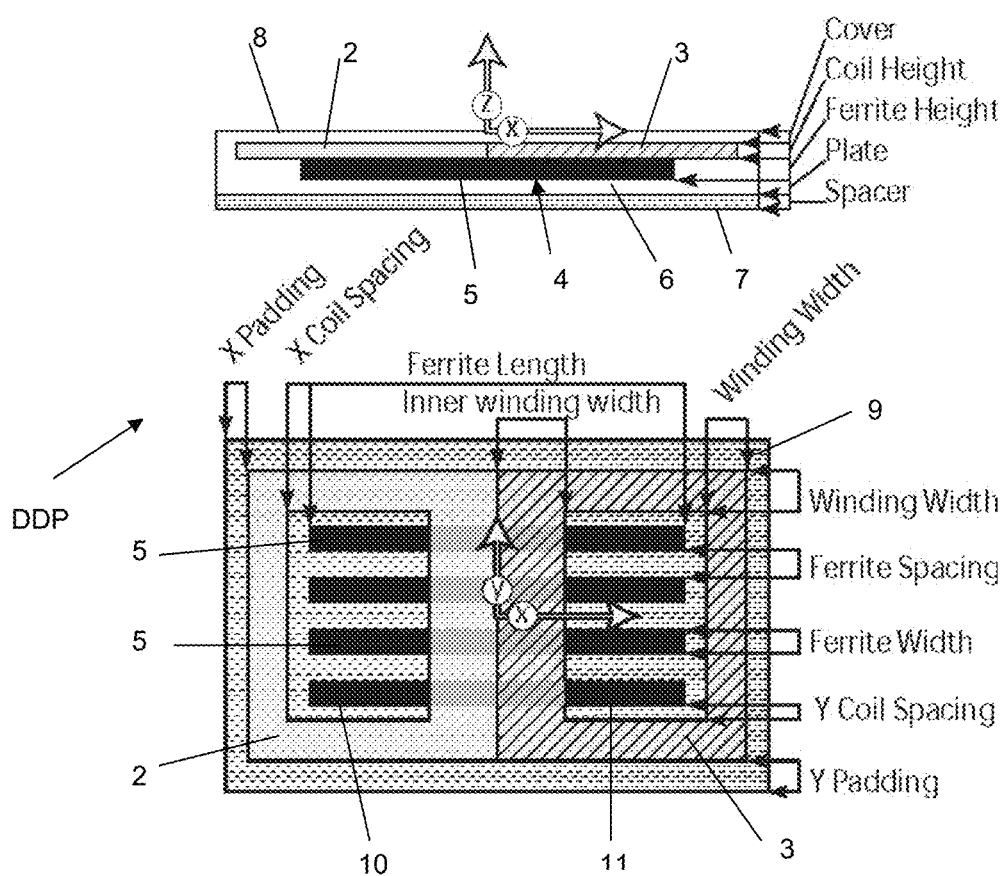

(51) Int. Cl.
*H02J 7/00* (2006.01)
*H02J 50/70* (2016.01)

(56) References Cited

U.S. PATENT DOCUMENTS

| | | | |
|---|---|---|---|
| 7,622,891 | B2 | 11/2009 | Cheng |
| 8,587,154 | B2 | 11/2013 | Fells |
| 8,970,168 | B2 | 3/2015 | Kohlschmidt |
| 9,071,061 | B2 | 6/2015 | Boys |
| 9,620,281 | B2 | 4/2017 | Covic |
| 10,263,466 | B2 | 4/2019 | Boys |
| 2006/0061323 | A1* | 3/2006 | Cheng .................. H02J 50/40 320/108 |
| 2007/0133239 | A1* | 6/2007 | Tanaka ................. H02M 3/337 363/16 |
| 2007/0159114 | A1* | 7/2007 | Chang ................ H05B 41/2822 315/274 |
| 2007/0258274 | A1* | 11/2007 | Richter ................. H05B 6/062 363/56.05 |
| 2007/0279002 | A1 | 12/2007 | Partovi |
| 2009/0010028 | A1* | 1/2009 | Baarman ................ H02J 50/12 363/25 |
| 2009/0102419 | A1 | 4/2009 | Gwon |
| 2009/0243397 | A1 | 10/2009 | Cook |
| 2010/0081483 | A1 | 4/2010 | Chatterjee |
| 2010/0259217 | A1 | 10/2010 | Baarman |
| 2010/0314947 | A1 | 12/2010 | Baarman |
| 2011/0025133 | A1 | 2/2011 | Sauerlaender |
| 2011/0049997 | A1 | 3/2011 | Urano |
| 2011/0073786 | A1 | 3/2011 | Shim |
| 2011/0297669 | A1* | 12/2011 | Jeanneteau ............. H05B 6/04 219/670 |
| 2012/0007437 | A1 | 1/2012 | Fells |
| 2012/0025602 | A1 | 2/2012 | Boys |
| 2012/0025603 | A1 | 2/2012 | Boys |
| 2012/0235636 | A1* | 9/2012 | Partovi ................. H02J 7/0013 320/108 |
| 2013/0026850 | A1 | 1/2013 | Throngnumchai |
| 2013/0051082 | A1* | 2/2013 | Lee ........................ H02M 3/01 363/17 |
| 2013/0249303 | A1 | 9/2013 | Keeling |
| 2013/0314035 | A1 | 11/2013 | Kohlschmidt |
| 2014/0239729 | A1 | 8/2014 | Covic |
| 2014/0361633 | A1* | 12/2014 | Abe ..................... H02J 50/402 307/104 |

FOREIGN PATENT DOCUMENTS

| | | |
|---|---|---|
| WO | 2007100265 | 9/2007 |
| WO | 2008014033 | 1/2008 |
| WO | 2008140333 A2 | 11/2008 |
| WO | 2010090538 | 8/2010 |
| WO | 2010090539 A1 | 8/2010 |
| WO | 2011016736 A2 | 2/2011 |
| WO | 2011016737 | 2/2011 |
| WO | 2013122483 | 8/2013 |

OTHER PUBLICATIONS

International Application No. PCT/NZ2013/000016, International Preliminary Report on Patentability dated May 19, 2014, 8 pages.
International Application No. PCT/NZ2013/000016, International Search Report and Written Opinion dated Jun. 24, 2013, 15 pgs.

* cited by examiner

MULTIPLE COIL FLUX PAD

CROSS REFERENCE TO RELATED APPLICATIONS

This application is a continuation of U.S. application Ser. No. 14/379,068, filed on Aug. 15, 2014, which is a U.S. national stage application filed under 35 U.S.C. § 371 from International Application Serial No. PCT/NZ2013/000016, which was filed Feb. 15, 2013, and published as WO 2013/122483 on Aug. 22, 2013, and which claims priority to New Zealand Application No. 598253, filed Feb. 16, 2012, the contents of which are hereby incorporated in their entirety.

FIELD OF THE INVENTION

This invention relates to apparatus for generating or receiving magnetic flux. The invention has particular, but not sole, application to a low profile, substantially flat device such as a pad for power transfer using an inductive power transfer (IPT) system.

BACKGROUND

IPT systems, and the use of a pad which includes one or more windings which may comprise the primary or secondary windings for inductive power transfer, are reproduced in our International Patent Publication No. WO 2008/14033, the contents of which are incorporated herein by reference.

One particular example application of IPT power transfer pads is electric vehicle charging, and that application is discussed in this section to provide the background to one application of the invention. However, electric vehicle charging is an example of only one application, and the invention has application to inductive power transfer in general. Electric vehicle charging may occur while the vehicle is stationary, or alternatively while the vehicle is moving along a roadway, for example. IPT power transfer pads can be used both in the vehicle as a power "pickup" (i.e. the secondary side winding of the IPT system), and at a stationary location such as a garage floor or a roadway for example as the "charging pad" (i.e. the primary side winding) from which power is sourced.

The purpose of an IPT roadway system is to wirelessly transfer power to a stationary or moving vehicle without physical contact to the vehicle. The transmitting part of the system consists of a power supply supplying a lumped coil (for example a pad as described above) or a track with many similar lumped coils where such a system is tuned for operation at a suitable frequency, usually anywhere from 10 kHz to 150 kHz. Where the receiver is placed underneath a vehicle and coupled to receive power either when the vehicle is stationary above or near (in sufficiently close proximity to couple power) to the primary transmitter. The pickup receiver also typically comprises a lumped coil (such as a pad described above) which is connected to a converter and appropriate controller within the vehicle to regulate power. For convenience, the part of a roadway from which power may be received inductively is referred to herein as a track.

The track may be formed by placing a plurality of pads along the centre of a lane in a roadway. This results in the possibility of an essentially continuous supply of power to the vehicle as it moves along the roadway in the immediate vicinity of the track.

In recent years such systems have received increasing attention due to their potential to allow sustainable wireless powered personal transportation. For such a system to be useful it should not only be able to transfer sufficient power over an airgap of reasonable size (e.g. 100-300 mm) it should also prove tolerant to any displacements between track and pickup, to avoid dependency on a vehicle-to-track guidance system. In a roadway system such displacement will most likely occur in the lateral direction (orthogonal to both vertical and the direction of movement) for moving vehicles. For stationary vehicle charging the ability to transfer acceptable levels of power with suitable longitudinal displacement is of particular concern in order to ensure ease of parking. The power transfer profile in the pick-up pad is ideally a smooth power profile which is essentially constant (and sufficient) over as wide as possible a distance laterally, with smooth drop-offs at each end. Such a power transfer profile eases the demands on the electronic (primary and secondary) regulators in the system, enabling improved operating performance for a comparable coupling over a system where during operation significant variations are experienced in the coupling between the primary and receiver pads.

A further problem to be solved is the need to be able to couple to vehicles or appliances with varying ground clearances, which largely determines the distance between the charging pad on the ground or as part of a primary structure (such as a mat or other surface) and the secondary pad of a particular vehicle or other device. In such applications there will be significant changes in coupling between the two pads that may require the primary inductive apparatus to operate with substantially increased VA to meet the power demand. This operation will also increase the magnetic field leakage present in the system, which may exceed allowable limits defined by regulations.

A further problem may occur if the primary and secondary inductive pads are polarised but oriented at an angle of 90 degrees to each other such that there is no coupling, and thus no possibility of power transfer.

Yet a further problem arises due to the many different possible pad designs and operation methods, and the potential mismatch between the charging and pickup pads. For example, the pad on the ground may have a completely different structure to the vehicle pickup, and/or may be operated as a single phase, two phase or multiphase system to produce substantially different field flux shapes within the space between the two coupled pads under time varying conditions. Under such conditions the ability of a fixed magnetic structure to capture power is limited.

An inductive power transfer apparatus which goes at least some way to addressing some of the above problems was described in our International Patent Publication No. WO 2011/16737, the contents of which are incorporated herein by reference. Embodiments of WO 2011/16737 provide a magnetic flux pad for generating or receiving magnetic flux, the pad including a magnetically permeable core, two substantially flat overlapping coils magnetically associated with the core whereby there is substantially no mutual coupling between the coils.

OBJECT OF THE INVENTION

It is an object of the present invention to provide an improved apparatus for generating and/or receiving magnetic flux for the purposes of inductive power transfer, or to at least provide the public or the industry with a useful choice.

SUMMARY OF THE INVENTION

In a first aspect the invention broadly provides a magnetic flux pad for generating or receiving magnetic flux, the pad comprising:
  a magnetically permeable core, and
  at least three overlapping coils magnetically associated with the core, the at least three coils all being positioned such that the windings thereof are in substantially the same plane,
  whereby there is substantially no mutual coupling between the coils in use.

The coils are preferably positioned proximate to or to abut the core such that the surface of the coils that abuts the core is substantially flat. For the avoidance of doubt, the coils may have a thickness such that the coils do not lie entirely within a single plane. Further, as will be appreciated, at least in the region where the coils overlap, there will be some deviation out-of-plane. References to being "in substantially the same plane" are to be interpreted subject to these limitations throughout the specification.

Preferably each coil in use is substantially decoupled from all other coils of the at least three coils.

Preferably the coils are substantially completely magnetically decoupled in use.

Preferably the coils partially overlap.

Preferably the coils are substantially coplanar.

Preferably the coils are provided on one side of the said permeable core, and a shielding means is provided on the other side of the core.

Preferably the shielding means comprises a shielding plate made of a suitable material such as aluminium.

Preferably a dielectric cover is provided on the side of the coils opposite the magnetic core.

Preferably the flux pad is adapted to receive currents from a power supply which are out of phase with each other to produce a time varying magnetic field which also varies spatially.

Preferably the field produced by the out-of-phase currents in the coils produces a time varying magnetic field which moves spatially and ultimately between poles of the magnetic field.

In a second aspect, there is provided a magnetic flux pad for generating magnetic flux, the magnetic flux pad being configured to be operable in a plurality of modes so as to control the magnetic flux generated thereby.

Preferably the magnetic flux pad includes three or more coils, any one or more of the coils capable of being selectively energised, thereby enabling said control to be effected.

Preferably, the coils are substantially magnetically decoupled from one another.

Any one or combination (including all) of the coils may be selectively energised as desired and depending on the particular implementation.

Note that when used herein, "mode" or the like is to be interpreted broadly as not only meaning that, say, the pad is capable of switching between two coils being energised and three coils being energised, but additionally or alternatively that different ones of the coils (but the same number), may be energised. For example, different ones or different pairs of a three coil pad may be selectively energised.

According to presently preferred embodiments, the flux pad includes three said coils. The provision of three coils strikes a balance between the additional performance and flexibility (provided by the adaptability of the flux) and the additional componentry and complexity thereof (particularly in positioning of the multiple coils).

Further features of the second aspect may be taken from the features set out in relation to the first aspect.

According to a third aspect, there is provided a ferrite arrangement for a magnetic flux pad having at least three coils, the ferrite arrangement comprising a plurality of elongate ferrite elements configured such that the elements are co-aligned with and/or parallel to an imaginary line extending between the centres of at least two of said coils.

Preferably a plurality of arrays of elements are provided, each array being aligned with the imaginary line between a different pair of coils. As will be appreciated, the imaginary lines between different coil centres may be parallel in some arrangements (see, for example, FIG. 5). Consequently, the same array (but extended perpendicular to the orientation of the ferrite element lengths) may be used for different pairs of coils.

According to some embodiments, the arrangement comprises (or when assembled forms) one or more raised and/or recessed portions provided on the surface of the ferrites configured to receive the coils. For example, for ease of reference, consider an arrangement where coils are positioned on the upper surface of a ferrite arrangement, raised ferrite portion(s) may be provided at an outer edge of one or more of the coils. Additionally or alternatively, a raised portion may be provided at a centre of one or more the coils. Other positions of raised portions are also possible, as are recessed portions. The provision of raised and/or recessed portions can be used to further adapt the flux to conform to a desired pattern.

According to one embodiment, the extent or combined operating area of the ferrite arrangement is commensurate with that of the coils.

According to one embodiment, the ferrite material extends beyond the extent of the coils. Preferably the increased extent of the provision of ferrites is provided at edges of the coils that cross the imaginary line (or are proximate thereto) but that are at the outer extremities of the coil/ferrite arrangement. Elsewhere, the coils may extend beyond the extent of the ferrites. Such arrangements of the ferrites and coils can improve efficiency and reduce the amount of ferrite material required because it is believed that only ferrite provided substantially along the imaginary lines will add to mutual inductance, ferrite material elsewhere simply adding to inductance. Extending the ferrite material beyond the extent of the coils along the imaginary lines can serve to capture flux spill out or over. This aspect of the invention may comprise only two coils and is not to be limited as requiring three or more coils.

Preferably the ferrite arrangement is configured for use in the magnetic flux pad of the first and second aspects.

In a fourth aspect the invention provides power supply apparatus for an inductive power transfer system, the power supply apparatus comprising:
  a magnetic flux pad for generating magnetic flux, the pad comprising:
    a magnetically permeable core, and
    at least three overlapping coils magnetically associated with the core, the at least three coils all being positioned such that the windings thereof are in substantially the same plane; and
  a power supply adapted to provide a current in one coil which has a different phase to a current in the other coils.

Preferably, the power supply is adapted to provide a current in any one coil so as to have a different phase to a current in all respective other coils in use.

Providing currents with different phases in each coil and adjusting the overlap between the coils, enables each coil to be substantially decoupled from all other coils.

Preferably the power supply is adapted to adjust the phase to produce a field that varies with time and with spatial position on the pad.

Preferably the apparatus comprises means to detect where a field is or is not required in the vicinity of the pad and adjust the phase and/or amplitude of the current in at least one of said coils in response thereto.

More preferably, the means to detect is adapted to adjust a relative phase between at least a first of said coils and at least a second of said coils.

Preferably the power supply comprises an inverter for each coil.

According to one embodiment, the power supply operates two of three inverters to be synchronised with each other such that in one mode of operation the power supply produces a current in a first one of said coils (preferably any one said coils) which is 90° out of phase with the current in a second one of said coils.

According to another embodiment, the power supply operates one of three inverters to produce a current in one of said coils, preferably any one said coils. Where different ones of said coils may be driven independently of the other coils, preferably the current is produced in the coil that is in closest proximity to a coil on a vehicle.

Preferably the magnetic flux pad produces a sliding time varying magnetic field.

According to one embodiment, the power supply operates at least one pair of the at least three coils 180° out of phase with each other. In this embodiment a common inverter may be used, or two inverters, one driving each coil.

Thus, the present invention provides all of the flexibility and functionality described in WO 2011/16737 but provides additional functionality and flexibility by enabling additional single coils or pairs of coils that may be energised, as well as enabling higher numbers of coils to be energised, thereby enabling the flux to be better tailored and improve power transfer. For example, the coils energised may be selected at least in part on the required rate of power transfer or the relative position between the pickup and the charging pad.

In a fifth aspect, the invention provides power supply apparatus for an inductive power transfer system, the power supply apparatus comprising:
  a magnetic flux pad for generating magnetic flux, the magnetic flux pad being configured to be operable in a plurality of modes so as to control the magnetic flux generated thereby; and
  a power supply adapted to provide a current to the magnetic flux pad.

Other features of the fifth aspect are readily derivable from features of the first through fourth aspects without invention in light of the disclosure herein. For the avoidance of doubt, the magnetic flux pad may be configured to be operable in the plurality of modes by selectively energising any one or combination of at least three coils of the magnetic flux pad. Further, the particular coils energised may be varied.

In a sixth aspect the invention broadly provides a method for providing an IPT magnetic flux pad having at least three coils in which there is no mutual magnetic coupling between the coils, the method comprising the steps of:
  overlapping the coils; and
  varying the overlap between the coils such that an overlap position is achieved whereby there is substantially no mutual coupling between the coils.

Preferably the absence of mutual coupling is detected by detecting when an open circuit voltage induced in a first one of the coils by energisation of at least one (but preferably all) of the other coils is minimised.

Energisation of the other coils may comprise energising each coil in turn and/or energising multiple coils simultaneously and/or energising each coil as they would be energised in normal use, including with varying phases between the coils.

According to one embodiment, overlap determination is achieved by considering pairs of said at least three coils in turn (i.e., for an arrangement having three coils, evaluating coil 1 against coil 2, coil 2 against coil 3, and coil 3 against coil 1).

According to one embodiment, the method comprises detecting an open circuit voltage induced in a second one of the coils substantially simultaneously (or at least subject to the same operating conditions) as when the open circuit voltage is detected for the first coil. This may similarly be performed for the third (and more) of said plurality of coils.

In a seventh aspect, the invention provides a method of generating magnetic flux, the method comprising:
  selectively energising one or more coils of at least three coils of a magnetic flux pad.

For the avoidance of doubt, said selectively energising may comprise energising any subset of the coils, or all of the coils.

Preferably said selectively energising comprises switching between energising a first subset of coil(s) and a second subset of coil(s).

The first and second subsets may comprise the same or a different number of coils. Further, one or more coils may be common to both subsets.

Additional or alternative subsets of coils may additionally or alternatively be energised. Further, one or more of said subsets may comprise all said coils.

Further features of the method of the seventh aspect may be derived from analogous features of the first through sixth aspects.

In an eighth aspect the invention may broadly be said to consist in a magnetic flux pad for generating or receiving magnetic flux, the pad comprising:
  at least three coils positioned such that the windings thereof are in substantially the same plane; and
  a power supply or pickup controller operable to selectively conduct with two or more of the coils such that a magnetic field is produced or power is received by at least one of a plurality of pairs of the at least three coils.

Preferably the power supply or pickup controller is operable to operable to selectively conduct with the coils to energise or receive power from any one or more of the coils.

Preferably the power supply or pickup controller is operable to sequentially energise or receive power from the at least three coils.

Preferably the power supply or pickup controller is operable to independently control the phase, magnitude and/or frequency of current in each of the at least three coils.

Preferably the at least three coils are substantially mutually decoupled from one another.

Preferably the at least three coils partially overlap.

Preferably the at least three coils are spaced substantially equidistantly from one another.

Preferably the magnetic flux pad comprises three substantially mutually decoupled coils.

Preferably the magnetic flux pad is operable in a plurality of modes comprising at least two of:
single-phase modes, wherein one or more of the coils are energised in phase with each other;
two-phase modes, wherein one or more of the coils are simultaneously energised out of phase with one or more other coils; and
a multiphase mode, wherein three or more of the coils are simultaneously energised out of phase with each other.

Preferably the magnetic flux pad further comprises a magnetically permeable core, wherein the at least three coils are magnetically associated with the core.

Preferably the magnetic flux pad comprises a further coil disposed substantially centrally and encircling or partially overlapping the at least three coils.

Preferably the further coil is substantially mutually decoupled from the at least three coils in at least one mode of operation.

Preferably the magnetic flux pad comprises:
three overlapping and substantially mutually decoupled coils each spaced substantially equidistantly from one another, and
a magnetically permeable core providing a low reluctance magnetic path between poles of the three coils.

Preferably the power supply or pickup controller is operable to independently control the magnitude, phase, and/or frequency of current in each coil.

Preferably the flux pad is operable in at least a three-phase mode.

In a ninth aspect the invention may broadly be said to consist in a magnetic flux pad for receiving magnetic flux and supplying power to a load, the magnetic flux pad being configured to be operable in a plurality of modes so as to control the magnetic flux received thereby, and comprising three or more coils capable of being selectively operated to enable said control to be effected.

In a ninth aspect the invention may broadly be said to consist in a pickup apparatus for an inductive power transfer system, the pickup apparatus comprising:
a magnetic flux pad for receiving magnetic flux, comprising at least three coils positioned such that the windings thereof are in substantially the same plane; and
a pickup controller adapted to operate one coil with a different phase to the other coils.

Further aspects of the invention will become apparent from the following description.

DRAWING DESCRIPTION

Figure 2:
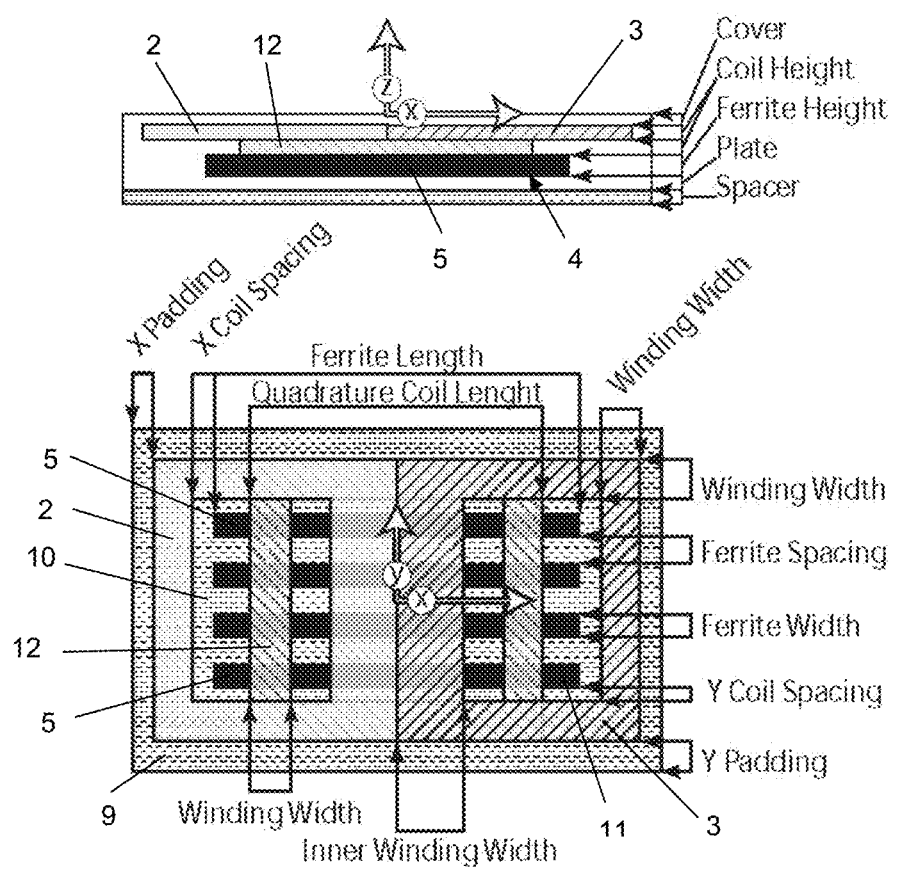
Figure 3:
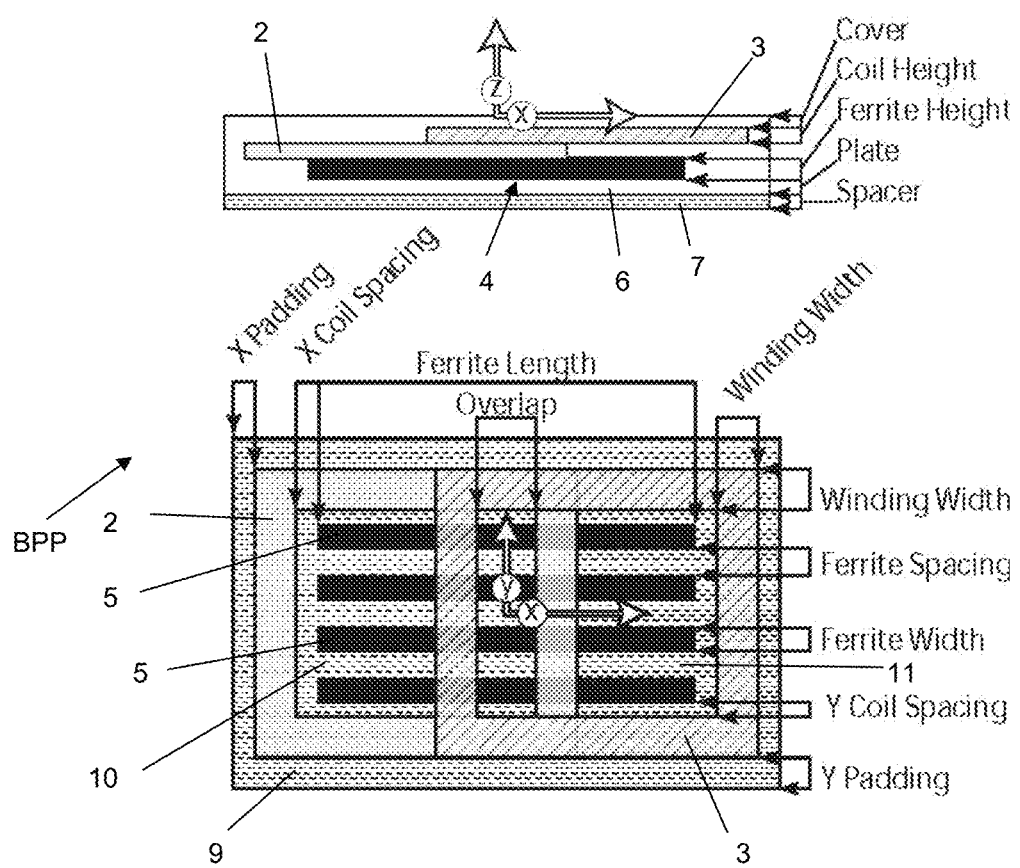
Figure 4A:
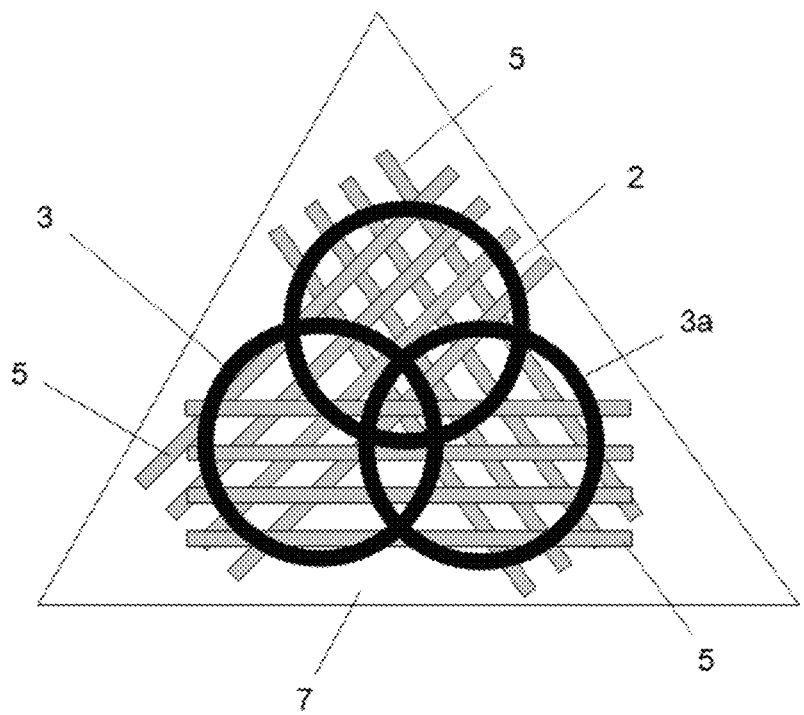
Figure 4B:
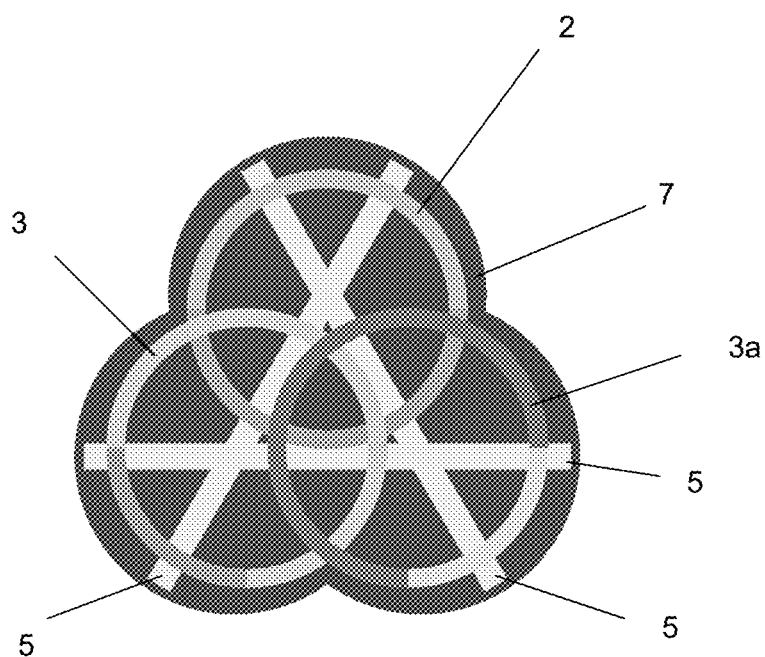
Figure 5:
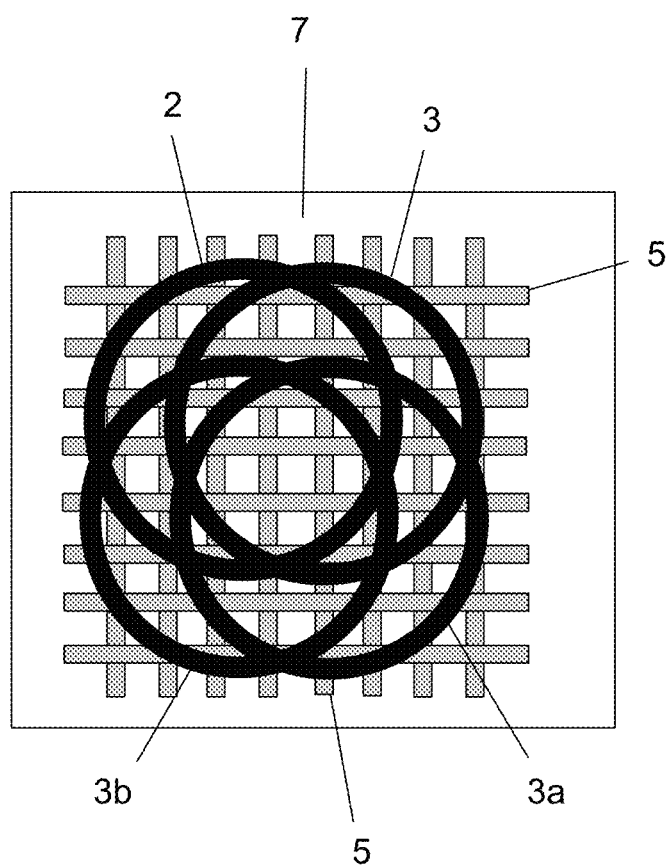
Figure 6:
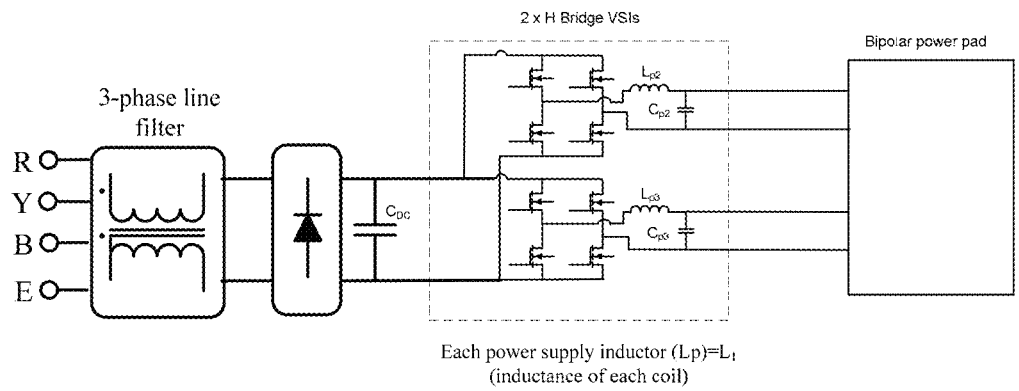
Figure 7:
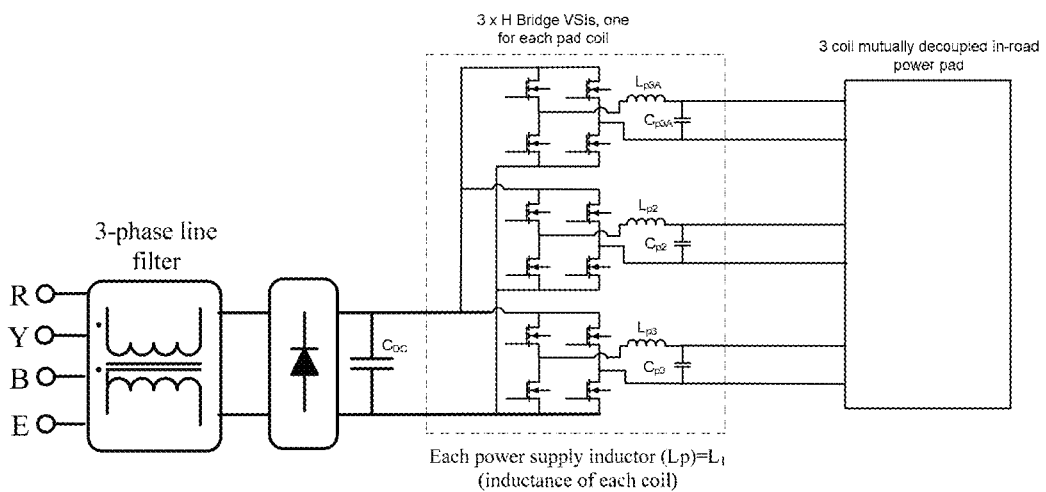
Figure 8:
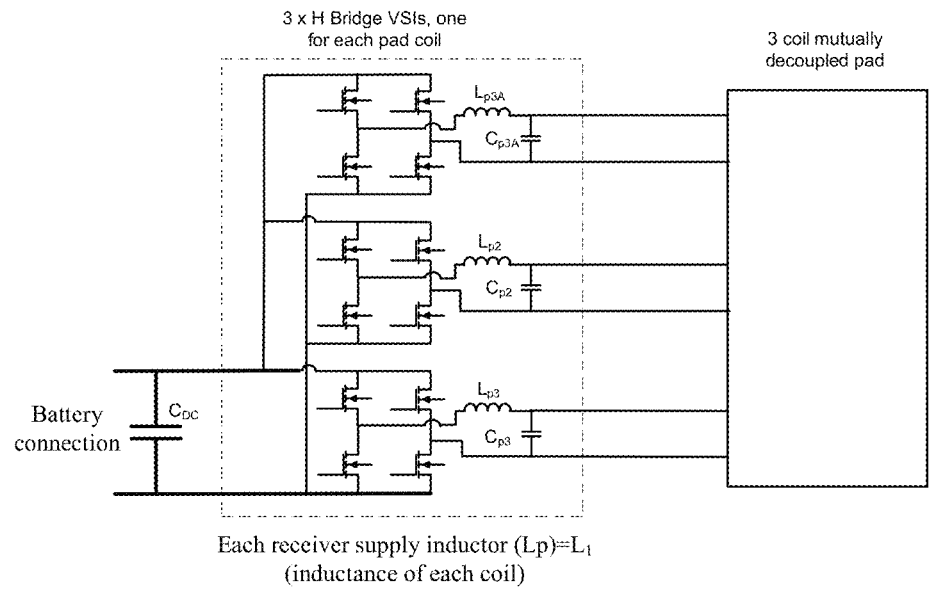
Figure 9:
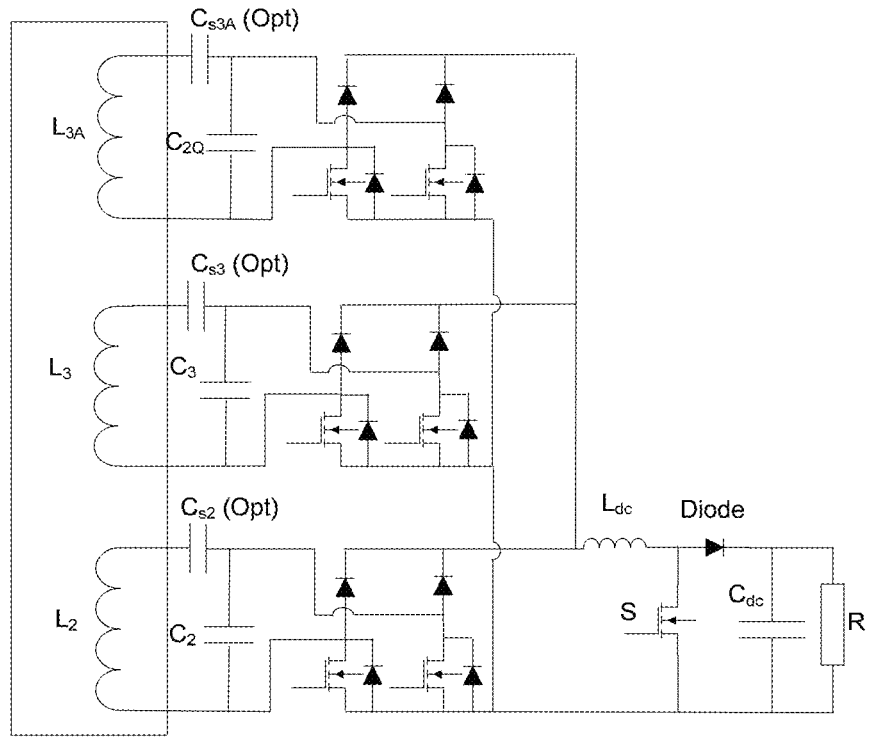
Figure 10:
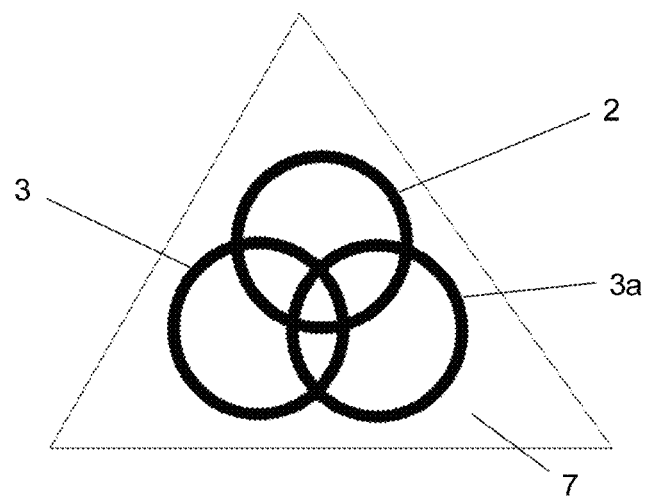
Figure 11:
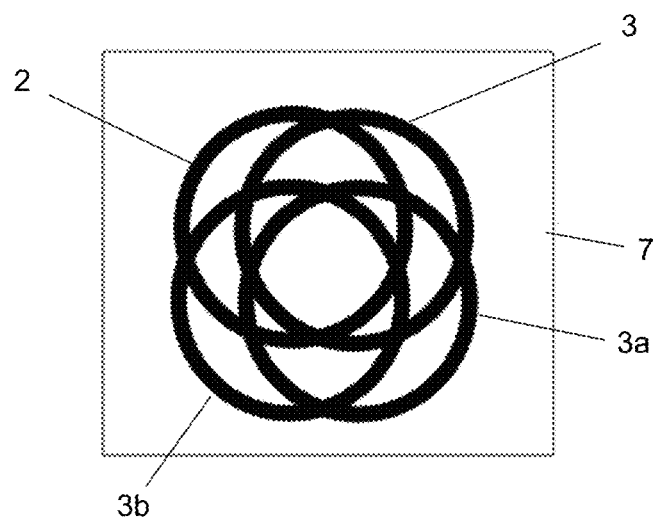
Figure 12A:
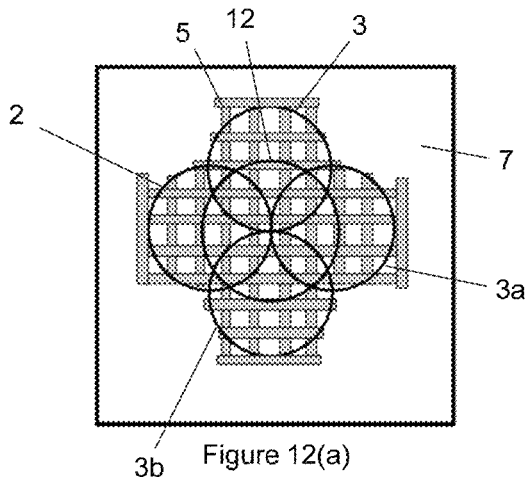
Figure 12B:
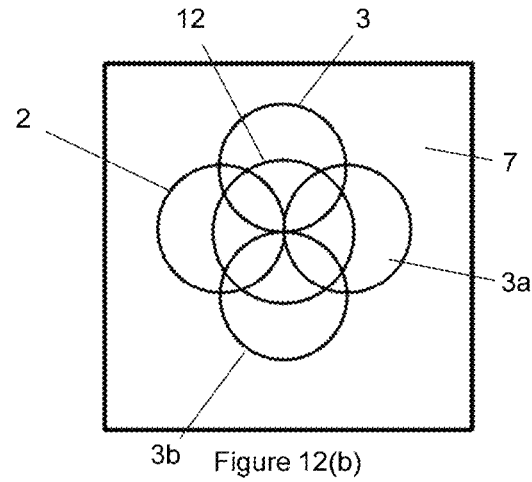
Figure 12C:
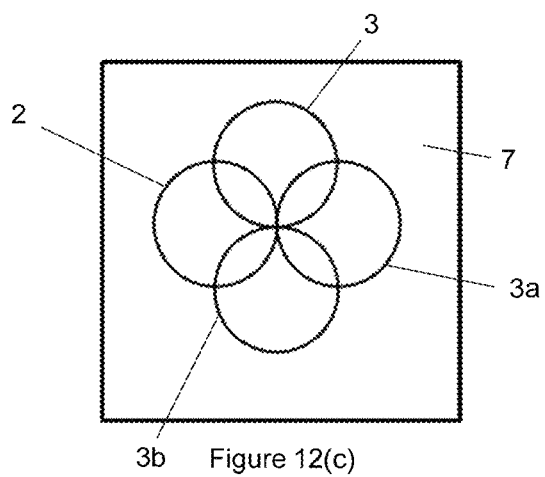
Figure 12D:
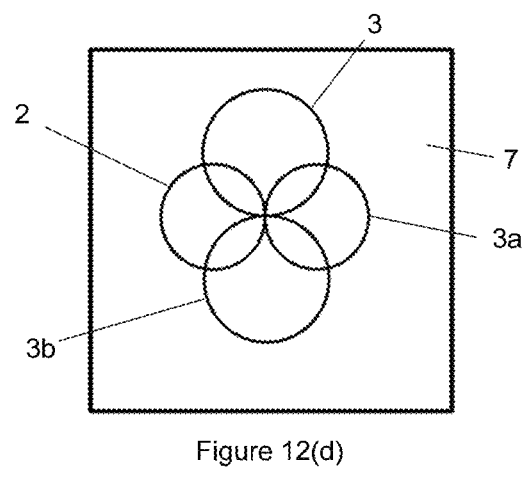
Figure 12E:
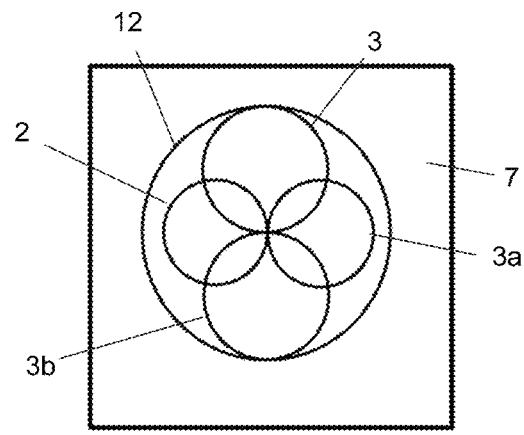
Figure 13A:
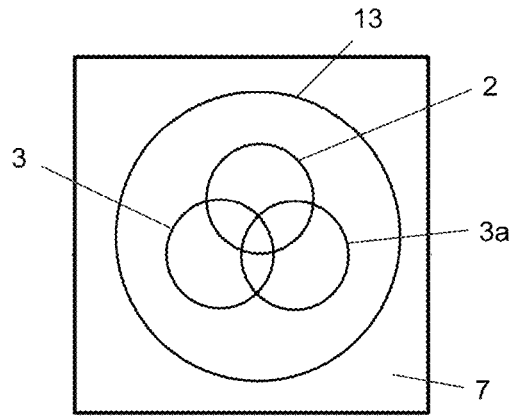
Figure 13B:
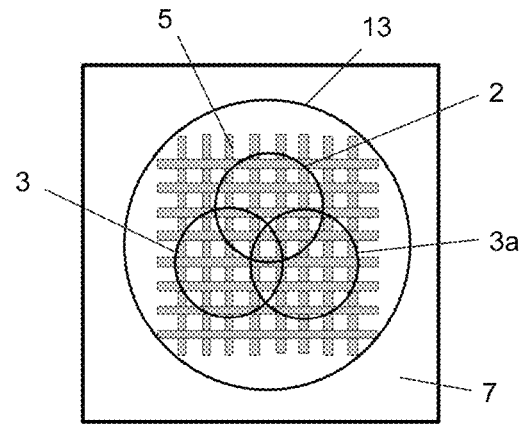
Figure 13C:
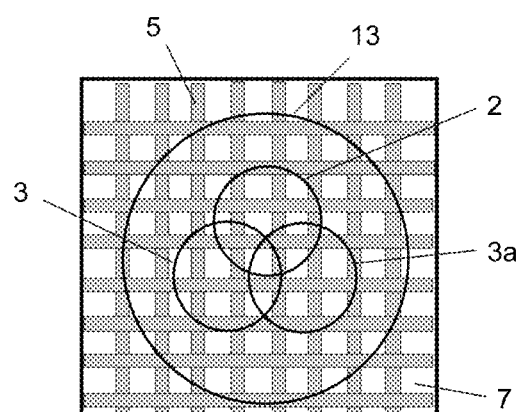
Figure 13D:
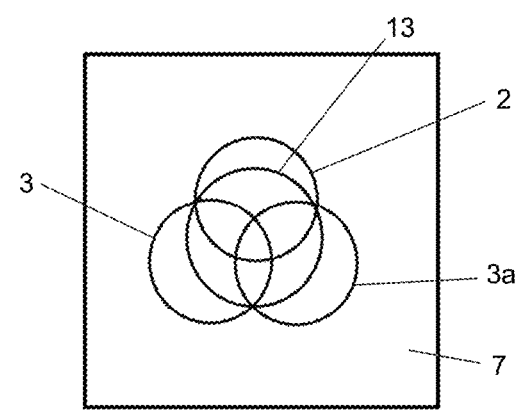
Figure 13E:
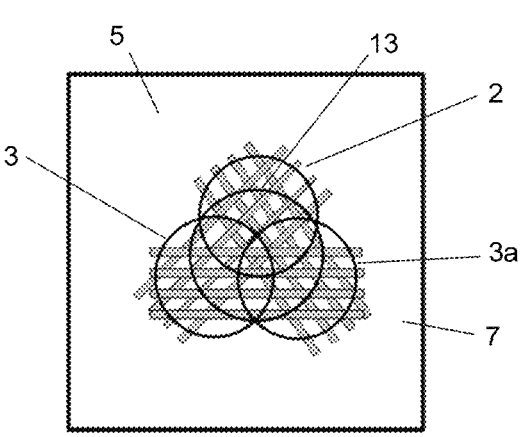
Figure 14A:
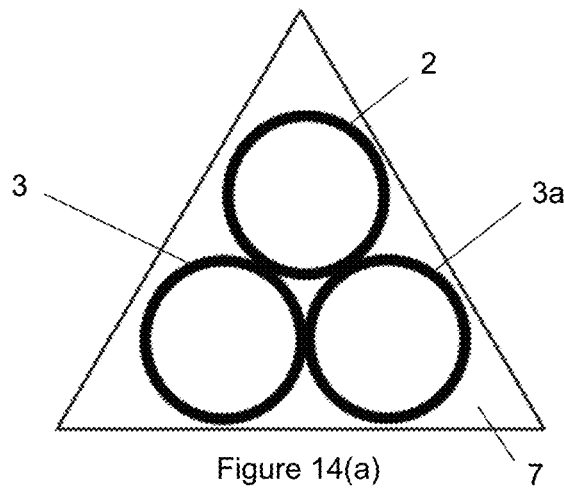
Figure 14B:
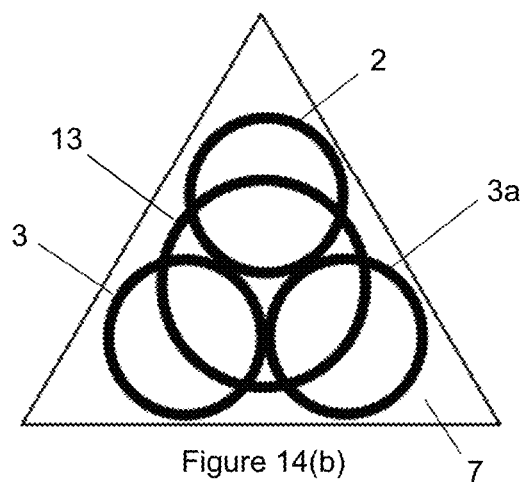
Figure 14C:
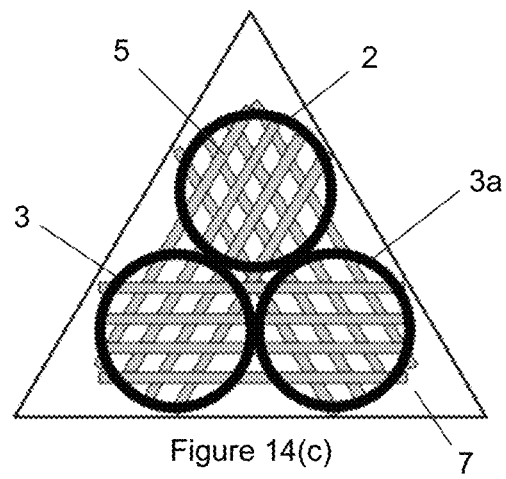
Figure 14D:
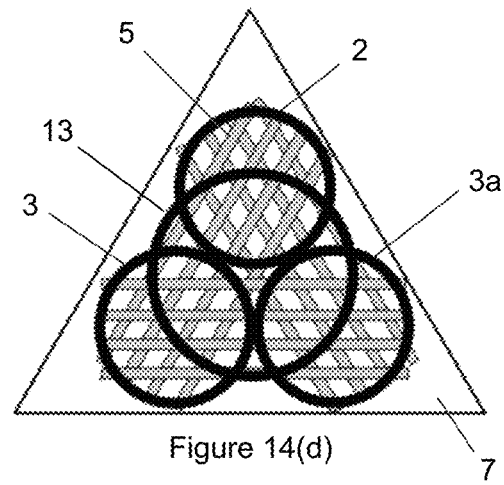

One or more embodiments of the invention will be described with reference to the accompanying drawings in which:

FIG. 1 is a side view and a plan view respectively of a magnetic flux pad;

FIG. 2: is a side view and plan view respectively of the pad of FIG. 1 including a quadrature coil;

FIG. 3: is a side view and plan view respectively of an alternative form of magnetic flux pad;

FIG. 4(a): is a plan view of a magnetic flux pad according to a first embodiment of the invention;

FIG. 4(b): is a plan view of a variation of the first embodiment;

FIG. 5: is a plan view of a magnetic flux pad according to a second embodiment of the invention;

FIG. 6: is a schematic power supply circuit for a known 2 coil pad with mutually decoupled coils;

FIG. 7: is a schematic power supply circuit for a three coil mutually decoupled pad;

FIG. 8: is a schematic receiver circuit for a three coil pad with mutually decoupled coils which can both receive and reverse power flow to and from the load;

FIG. 9: is a schematic circuit for a three coil pad with mutually decoupled coils which can independently decouple any of the coils and control power flow to the load;

FIG. 10: is a plan view of a magnetic flux pad according to a third embodiment of the invention;

FIG. 11: is a plan view of a magnetic flux pad according to a fourth embodiment of the invention;

FIG. 12(a): is a plan view of another embodiment of a magnetic flux pad according to aspects of the invention;

FIG. 12(b): is a plan view of another embodiment of a magnetic flux pad according to aspects of the invention;

FIG. 12(c): is a plan view of another embodiment of a magnetic flux pad according to aspects of the invention;

FIG. 12(d): is a plan view of another embodiment of a magnetic flux pad according to aspects of the invention;

FIG. 12(e): is a plan view of another embodiment of a magnetic flux pad according to aspects of the invention;

FIG. 13(a): is a plan view of another embodiment of a magnetic flux pad according to aspects of the invention;

FIG. 13(b): is a plan view of another embodiment of a magnetic flux pad according to aspects of the invention;

FIG. 13(c): is a plan view of another embodiment of a magnetic flux pad according to aspects of the invention;

FIG. 13(d): is a plan view of another embodiment of a magnetic flux pad according to aspects of the invention;

FIG. 13(e): is a plan view of another embodiment of a magnetic flux pad according to aspects of the invention;

FIG. 14(a): is a plan view of another embodiment of a magnetic flux pad according to aspects of the invention;

FIG. 14(b): is a plan view of another embodiment of a magnetic flux pad according to aspects of the invention;

FIG. 14(c): is a plan view of another embodiment of a magnetic flux pad according to aspects of the invention; and FIG. 14(d): is a plan view of another embodiment of a magnetic flux pad according to aspects of the invention.

DETAILED DESCRIPTION

FIGS. 1 to 3 are prior art arrangements taken from the aforementioned International Patent Publication No. WO 2011/16737.

Referring to FIG. 1, a prior art magnetic flux pad construction is shown. For convenience, this general construction is referred to herein as a DDP pad, and is generally referenced DDP in the relevant drawing figures.

The DDP pad shown in FIG. 1 generally comprises two substantially coplanar coils referenced 2 and 3 which are magnetically associated with, and sit on top of, a core 4. As can be seen, the core 4 may consist of a plurality of individual lengths of permeable material such as ferrite strips or bars 5 which are arranged parallel to each other but spaced apart. The pad construction may include a spacer 6 on which the core is located, and a plate 7 below the spacer. A cover 8 may be provided on the other surface of the flat coils 2 and 3. Padding 9 may be provided about the periphery of the pad. As can be seen, the coils 2 and 3 each define a pole area 10 and 11 respectively. This DDP pad construction shows very good characteristics suitable for IPT power transfer applications such as vehicle charging. The coils 2, 3 may be connected out of phase and driven by a single inverter to produce a stationary time varying magnetic field to couple to a receiver (which may for example be of substantially the same magnetic design) at distances suitable for electric vehicle power transfer with good coupling.

Turning to FIG. 2, the DDP construction of FIG. 1 is shown but further including a quadrature coil 12 (referred to herein as a DDPQ pad). The quadrature coil extends the power transfer profile when there is lateral movement of the construction shown in FIG. 2 with respect to a flux generator such as the DDP pad of FIG. 1 when energised by an appropriate inverter. The quadrature coil allows power to be extracted from the "vertical" component of the magnetic field that the receiver pad intercepts while the other coils 2, 3 facilitate power extraction from the "horizontal" component of the flux intercepted. Therefore, the construction of FIG. 2 is suited as a flux receiver.

Turning to FIG. 3, another construction is shown which is referred to in this document as a bi-polar pad or, alternatively, as a BPP pad. The BPP pad has a similar construction to the DDP pad discussed with respect to FIGS. 1 and 2 above as it enables excellent coupling to secondary receivers at distances suitable for charging and powering of electric vehicles.

The BPP pad consists, from bottom up, of an aluminium plate 7, a dielectric spacer 6, a core 4 comprising four rows of ferrite bars 5 (referred to herein as ferrites), two flat substantially coplanar, yet overlapping and ideally "rectangular" shaped coils 2, 3 (although in practice these are more oval due to the ease in winding Litz wire) spread out in the lateral direction, and a dielectric cover 8. The core 4 acts as a shield so that ideally all flux is directed away form the core 4 through the top of the pad. The plate 7 merely acts to a) eliminate any small stray or spurious fields that may be present beneath the core 4 in certain environments, and b) provide additional structural strength. Table A1 provides example dimensions of a working prototype of a BPP pad. Tables A2 and A3 provide example dimensions of the DPP pad of FIG. 1 and the DDPQ pad of FIG. 3, respectively.

The magnetic structure of the BPP of FIG. 3 is designed so that there is substantially no mutual coupling between either of the coils 2, 3 in the primary, as described later. This allows the coils to be driven independently at any magnitude or phase without coupling voltage into each other which if present would oppose the power output of such a coil.

In one mode of operation, the two coils within the BPP can be driven using two separate but synchronised inverters operating with known current magnitude and phase difference as shown conceptually in FIG. 6. The switches in the H-bridge inverter of FIG. 6 are shown as FETs.

In practice these switches may comprise an IGBT with a suitable inverse parallel diode, or SiC JFET and SiC diode or other suitable arrangement as desired. The power supply tuning arrangement of FIG. 6 uses a known LCL topology (see, for example, WO 2007/100265) at the output of the each inverter's H-bridge. The inductances in each of the coils of FIG. 3 are assumed to be identical based on them having the same shape and turns ratio. This inductance (as seen by the supply and including lead lengths and any other compensation elements such as a series capacitor which may be required to limit voltage across the power supply tuning capacitor $C_p$) is given a value of $L_1$. The primary inductor ($L_p$) is chosen to be identical to $L_1$, and the tuning capacitor $C_p$ has an identical reactance at the designed frequency of the supply. Subscripts 2 and 3 represent the circuit attached to coils labelled 2 and 3 in the BPP of FIG. 3. If the coils are completely magnetically decoupled, ideally there will be no power transfer between the primary inverters to limit power transfer to the secondary receiver, although due to small loading differences on the coils from a receiver there may be some small mutual coupling which may cause a small residual current to flow between the inverters. Because the DC bus of each inverter is common, this residual current simply circulates between the inverters and does not cause any issue or loss of performance during operation.

The two inverters shown in FIG. 6 may be synchronised but operated so as to produce currents with the same RMS magnitude, but operating 90 degrees out of phase in each of the coils 2, 3. By having a 90° phase separation between the currents in the coils 2, 3, a spatially varying and time varying magnetic field is created rather than the stationary time varying magnetic field of the DDP. The spatial variation in the field of the BPP may appear as a sliding movement in alternate directions between the poles of the coils 2, 3.

Other relative phase and/or magnitude variations between the currents in the coils could be used to shape the field if there is a need to reduce the field emissions on one side of the transmitter to avoid leakage during operation due to an offset nature of the coupled receiver, for example to meet ICNIRP regulations. Thus the field may be directed in response to the output of a sensor for example which may sense where greater field strength is required, or where the field strength should be reduced. Also, the field strength may be time varying but spatially stationary dependent on where across the pad the field is required.

It is also possible to operate the coils 2, 3 180 degrees out of phase using the circuit of FIG. 6, or they could be simply connected to one inverter (as in the DDP operation). This particular single phase operating mode is a second possible mode of operation to simplify the electronic control and power conversion that will produce a stationary time varying field as for the DDP.

WO 2011/16737 further provides guidance on preferred configurations of the ferrite strips 5 above which the coils 2, 3 are placed in the BPP pad. The ferrite strips 5 are used to enhance power transfer and ensure that a predominately single sided flux field is created to best couple to the secondary power receiver, while ensuring that a minimal amount of ferrite is used to keep weight to a minimum and restrict the inductance of the pad. In such a sliding field it is shown that the ferrite strips should preferably extend under the winding coils otherwise the field may not be forced upwards towards the receiver.

When the two primary coils 2, 3 of the BPP are placed with an arbitrary overlap (or substantially adjacent with no overlap) with respect to each other, there will be a mutual coupling between the coils. However for a certain ratio of overlap to coil width, denoted $r_o$, this mutual coupling is almost zero. The ideal overlap required to ensure no mutual coupling exists between each primary coil is not simple due to the presence of the ferrite but can be determined by simply fixing one coil and energising this with a predetermined current at fixed frequency (either via a suitable 3D simulator or using a suitable experimental setup, for example). The open circuit voltage induced in the second primary coil can then be measured. If the second coil is moved so as to change the overlap there will be a change in coupled voltage. When this is minimised (ideally zero) the ideal configuration can be set. The optimal overlap is dependent on the length of the ferrite strips underneath the coils.

In WO 2011/16737 it was noted that there was a significant increase in power when the ferrite under the coils was extended, and it was clear that the ferrite should extend at least under the entire extent of coils 2, 3 for the BPP pad arrangement of FIG. 3. The reason for this is that the field close to the BPP pad can best be described as a sliding wave across the surface.

FIG. 4(*a*) shows a plan view of a variation of the FIG. 3 arrangement according to an embodiment of the invention. The magnetic flux pad of FIG. 4(*a*) includes three coils 2, 3, 3*a* and a modified ferrite 5 arrangement. Otherwise, the construction of the pad of FIG. 4(*a*) is generally in accordance with that of the BPP pad of FIG. 3, including, from the bottom upwards (when comparing with the upper drawing of FIG. 3), base plate 7 (preferably aluminium), spacer 6 (preferably dielectric), a core 4 comprising ferrite material 5, substantially co-planar coils 2, 3, 3*a* and a cover 8 (preferably dielectric). The key difference is that an additional coil 3*a* is placed above or below coil 2 or above coil 3 such that the centres or poles of all three coils are spaced substantially equidistantly from one another in a triangular arrangement. Furthermore, the configuration of the core 4 has been adapted and includes three sets of ferrites 5 arranged with an offset of or substantially of 60° between each set, wherein each the three ferrite sets extends substantially parallel with an axis extending between the centre of respective pairs of coils 2, 3 and 3*a*.

FIG. 4(*b*) illustrates a variation of the embodiment of FIG. 4(*a*), in which the core comprises a single ferrite strip or bar 5 along each of the imaginary lines between the centres of the coils, forming at equilateral triangle in the centre. The plate 7 in this embodiment has a shape corresponding substantially with the outer perimeter of overlapping coils 2, 3 and 3*a*, including padding.

FIG. 5 shows a plan view of another embodiment of the invention. The arrangement of FIG. 5 is substantially the same as those of FIG. 4 but includes four coils 2, 3, 3*a*, 3*b* and a modified ferrite 5 arrangement within the core 4. The additional coil 3*b* may be placed above, below or between coils 2, 3 and 3*a*. In the arrangement shown, a ferrite lattice is used with one set of ferrites offset from the other by or substantially by 90° to form a grid.

As with the arrangement of FIG. 3, the extent of overlap between the coils may be varied to obtain the desired decoupling. More particularly, one or more of the at least three coils may be energised with a predetermined current at a fixed or respective fixed frequency and the overlap with the other or other ones of the at least three coils varied so as to minimise the voltage in the other or other ones of the at least three coils. To achieve such an overlap in practice, preferably the ferrites 5 should first be fixed in place (since any change to the position and shape of ferrites 5 will impact on the overlap required between the coils necessary to ensure mutual coupling is minimised). The shape and size of each of coils 2, 3 and 3A should preferably be identical (although the invention is not limited thereto). If coil 2 is fixed in position, then coil 3 can be moved into the relative position shown while energising coil 2. The open circuit voltage coupled into coil 3 from the energisation of coil 2 can be easily measured and with suitable movement of coil 3 relative to coil 2 can be reduced to a minimum (ideally zero), to determine the ideal relative position of both coils. Once the position of coils 2 and 3 have been fixed, then coil 3*a* can be added generally in the position shown on FIG. 4(*a*). Coil 3*a* can now be energised and the voltages coupled into coils 2 and 3 monitored. By adjusting the position of coil 3*a* relative to both coils 2 and 3 the coupled voltages should be reduced to a minimum (ideally zero), at which point its position is fixed.

While circular coils are shown in FIGS. 4 and 5, the invention is not limited to coils of that shape. By way of example only, the coils may alternatively have a generally oval, square or rectangular configuration. Further, different coils within the same pad may have different configurations. For example, referring to the FIG. 4(*a*) arrangement, coil 2 may be oval and coils 3, 3*a* circular. Furthermore, while the lateral spacing of the circular coils of the Figures may be substantially equidistant such that imaginary lines or axes extending between the centres of adjacent coils may form a substantially equilateral triangle or square shape, this need not necessarily be the case.

Further, while particular ferrite 5 arrangements have been shown in FIGS. 4 and 5, the invention is not limited thereto. Other arrangements may be devised to direct the field in a desired manner, or more particularly to provide a path of low magnetic reluctance between the poles of the three or more mutually decoupled coils, including a single sheet of ferrite material of sufficient size. However, it has been found that the use of ferrite strips as opposed to a sheet of ferrite material provides similar performance in terms of controlling the flux and so appropriately configured strips may be favoured to reduce the cost and weight thereof. On the other hand, a core comprising a sheet of ferrite material may be thinner and preferred in other applications, and may be shaped to ensure that it provides a path of low magnetic reluctance only between the poles.

As shown in FIGS. 4 and 5, where ferrite strips are used, it is preferable that these are arranged to pass through or be parallel to an imaginary line or axis extending between the centres of adjacent coils. Thus, arrays of ferrite strips may be provided, each array being configured to be so aligned with one or more pairs of said coils (i.e., with the imaginary lines or axes extending between coil centres).

Generally, it is preferable for the ferrite material to extend beyond the edges of the coils (as shown in at least FIGS. 4 and 5). However, the invention is not limited thereto and may be configured differently depending on the particular application and the coils may in fact extend over a larger area than the ferrite material.

According to one embodiment, the ferrite material extends beyond the outer extremity of the coils in selected regions of the coils only, the selected regions being at or proximate to where said imaginary lines cross said coils (see FIG. 3). Additionally or alternatively, one or more of the coils may extend beyond the extent of the ferrites, preferably outside of said previously mentioned selected regions (again, see FIG. 3).

Referring to FIGS. 4 and 5, while it is possible for the ferrites to include arrays of strips one above the other as shown, preferably, the ferrites are configured to form the desired pattern in a single layer. For example, referring to FIG. 5, the ferrites may be arranged such that the ferrites extending up and down the page (the vertical ferrites) are as shown and the left to right ferrites (the horizontal ferrites) are then each formed by a plurality of shorter ferrites that extend across the gap between the vertical ferrites, preferably such that the ends of the horizontal elements abut or substantially abut the adjacent vertical ferrites.

Forming the ferrites in this manner reduces the thickness and weight of the core.

It will be appreciated that the ferrites may be otherwise configured. For example, referring again to the FIG. 5 example, the strips may have a varying thickness such that they are thinner at the regions of overlap. Reducing the thickness as a step enables the different ferrite elements to interlock.

The examples of ferrite arrangements described in relation to FIG. 5 in the preceding three paragraphs are not intended to be limited to the FIG. 5 arrangement and may be adapted without invention to other required ferrite arrangements such as those similar to the FIG. 4 arrangement or those requiring a more complicated ferrite arrangement where additional coils are added.

Further, each strip of ferrite may be formed from more than one piece of ferrite material. Thus, smaller strips or pieces of ferrite material may abut or substantially abut one another to form each larger piece.

Additionally or alternatively, the degree of integration between adjacent ferrite portions may be increased. For example, a ferrite arrangement may be formed from one or more sheets of ferrite material with portions thereof removed as desired.

Further coils may also be added, as desired.

FIG. 7 shows a possible power supply arrangement necessary for driving the pad shown in FIG. 4. As shown subscripts 2, 3 and 3A represent the inverter topology connection to coils 2, 3 and 3A in FIG. 4.

An advantage of using at least three coils of the present invention is that the pad may be used in multiple modes. For example, for a stationary vehicle charging application, a single coil of at least three coils of a charging pad may be activated to couple power to a small receiver on a small utility vehicle, where the chosen coil to be activated depends on the coil which is best coupled (i.e. best aligned) to the receiver on the vehicle. Alternatively, all coils may be energised in phase with each other, creating a larger stationary time varying field to power a large vehicle or one requiring faster charge. Further, said coils (preferably three) may be used in a three phase system (i.e. each 120 degrees out of phase) to create a sliding spatially varying and time varying field or multiple selected coils may be energised in a single phase system (i.e., to create a stationary time varying field).

In another mode, coils of the charging pad may be energised dependent on the orientation and/or alignment of the pick-up (e.g. on the vehicle to be charged). In this mode, all or a subset of the coils may be energised in use. For example, pairs of coils may be energised, per the BPP pad arrangement of FIG. 3, to produce a field most effectively received by a pickup. The pair of coils energised may be varied, for example, to modify the field to compensate for movement of the pickup. According to one embodiment, pairs of coils of a pad containing at least three coils may be selectively energised (including sequentially) if that produces the most effective field.

The presence of at least three coils further enables improved steering of the field generated by the charging pad. In addition or as an alternative to energising only selected coils of the plurality of coils, different coils may be energised to different levels, thereby "steering" the field in a selected direction to, say, accommodate misalignment of a pickup with a charging pad, such as due to variations in parking of vehicles to which a charge is to be provided.

The use of at least three coils can additionally or alternatively assist in sensing a location of a vehicle pickup so that an appropriate (ideally optimal) charging regime can be implemented, depending at least in part on the detected location. While this is achievable to some extent using the arrangements described in WO 2011/16737, the inclusion of additional coils provides greater accuracy of detected position and enables position to be determined in at least two dimensions.

Thus the use of additional, decoupled coils provides for increased flexibility in the manners in which the apparatus of the invention may be used by enabling all or a subset of the coils to be used and further provides for improved power transfer by varying the mode of operation and/or through the improved steering/positioning of the field achieved (improved in terms of being controllable in multiple dimensions and/or across a larger area and/or better determination of pickup position and/or adaptation of the field as a result thereof).

Operating the triangular arrangements of FIG. 4 in a three-phase mode is particularly useful, as it is capable of high power transfer, possesses the ability to cope with variable secondary alignments, and has inherent field cancellation (i.e. low/no leakage) in the far field.

It will be noted from the foregoing that embodiments of the invention have particular application for use as a "charging pad" (i.e., the primary side winding) but the same or similar arrangements may be used for the pickup, again with improved power transfer characteristics as a result of the decoupling between coils of the pickup. In such embodiments, the coils would be electrically coupled to and controlled by a pick-up controller, rather than a power supply, the pickup controller being operable to deliver power received from the pickup coils to a load. The controller would typically comprise a controllable rectifier or rectifiers, rather than the inverters of a power supply.

For example, the circuit of FIG. 8 which is essentially identical to the that of FIG. 7, could also be used at the output of a pad to enable power transfer to a load connected across the DC capacitor which in such a case could also be across the battery of an electric vehicle. The power available from each receiver coil can be monitored, and if small, the bottom switches in each inverter bridge can be closed to decouple that receiver coil and remove any losses which would otherwise occur from its operation.

In yet other embodiments of the invention, the primary and/or secondary pads may be reversible, wherein the pad may be operated to selectively conduct with the coils to receive or deliver power from/to another pad. The circuit of FIG. 8 could easily be used to reverse the power flow back to the primary but in order to synchronise this power flow back into mains utility supply, the three phase rectifier of FIG. 7 would need to be replaced with a suitable reversible rectifier.

Where reversible power flow is unnecessary, a simpler secondary circuit can be used, an example of which is shown in FIG. 9. At the output of each coil a tuning capacitor can be used either in series or parallel or both to bring each AC circuit to resonance. Here a parallel resonant circuit is shown with optional series capacitance to boost the current from each coil if required at design. The output of each of these tuned circuits is then rectified, filtered (using the common $L_{dc}$ and $C_{dc}$) and regulated using switch S to the load. If the coupled power to any of the coils is determined to be low, then the two switches at the base of each rectifier can be turned on and used to decouple that coil from the circuit without affecting the power transfer in either of the remaining coils, thereby substantially removing any loss associated with that circuit. This power transfer from each coil can be easily determined by measuring the magnitude of the AC current in each of the rectifiers. The output diode ensures that the energy in $C_{dc}$ is not discharged undesirably through any of the switches in the circuit when these switches are turned on. Switch S is used to both regulate the total power flow and decouple all three coils if and when required.

In any embodiment where the IPT pad of the present invention is configured as a primary side magnetic apparatus generating a magnetic field, it preferably couples power to the secondary or receiving pad as effectively as possible, irrespective of the secondary pad's magnetic configuration, orientation, and displacement (lateral or otherwise). The secondary pad may be integrated within a vehicle, mobile telephone, laptop or other such electrical device, providing little if any control over these variable factors. That is, the primary pad is preferably designed to be universal or near-universal in that it is adapted to transfer power to a range of possible secondary pads and/or under a wide range of conditions which could be reasonably anticipated in a particular application.

When a device with a circular secondary pad is in proximity with varying ground clearance or displacement with respect to the primary, for example, there will be a need to configure the system to best couple power from the primary to the secondary. If the device is in close proximity to the ground, then the coil which is in best alignment might be selected, whereas if the secondary is further away a group of coils may be energised either together in phase or as a multiphase system to produce a better coupling between the primary and secondary. Another important consideration is limiting or minimising magnetic field leakage at distances of concern, such as where there are foreign objects which may heat up or humans or animals which may be subjected to these leakage fields.

For secondary devices which have polarised magnetics such as those disclosed in International Patent Publication Nos. WO 2010/090539 or WO 2010/090538, then the orientation of this device is of equal concern. In such situations the primary coils may be energised to ensure best coupling and in the case where the coils are separately controlled either a single phase polarised coil with best orientation can be energised, or multiphase operation can be used to transfer power while ensuring greatest coupling and power transfer with minimal leakage for the designated application. Variations in ground clearance, alignment and rotation may all affect the choice of which coils are selected under what conditions. Preferably the coils in the primary ground side have minimal mutual coupling between them, so that any configuration is acceptable and can be used without detrimental effects such as coupled voltages from the energising of neighbouring coils appearing in nearby coils and disrupting power flow and the generation of the desired flux shape. However some mutual cross-coupling may be allowable in certain configurations if is sufficiently small, provided the power coupling between the apparatus is controllable and leakage is contained as required for the application.

It will be appreciated that numerous other embodiments or variations of the coil arrangements of FIGS. 4 and 5 are possible without departing from the scope of the present invention. A number of such embodiments and variations are briefly described below by way of example.

While a backing comprising the core and/or conductive plate is useful to ensure that the fields are single sided and can be oriented in space such that they enhance the coupling to a secondary magnetic device, the ferrite strips 5 are not essential to the present invention, and may in particular be omitted where a double-sided flux field may be tolerable or even desirable.

FIGS. 10 and 11 show variations of the embodiments of FIGS. 4 and 5, respectively, in which the ferrite strips 5 are omitted. Without the core a backplate made of a conductive material such as aluminium or copper provided a suitable distance from the coils may act as a shield while minimising losses. The plate 7 may therefore comprise a ferrite loaded printed circuit board (PCB) and/or an aluminium plate, for example. Alternatively there may be applications where there is a desire to have fields in both directions, such as in a primary pad which may need to couple to two or more secondary's which are situated both above and below the coils. In such cases the ferrite or shields can be removed entirely to enable such coupling. In other cases, the fields below the structure may not be able to couple undesirably to any structure, and therefore will not cause any losses. While having fields present on both sides of the primary reduces coupling to a secondary device, it does not produce any significant loss and may therefore be preferred in some circumstances to minimise the cost of producing the primary pad.

FIGS. 12(a) and 12(b) show two variations of a further embodiment of an IPT pad according to the present invention, with and without ferrite strips 5. The pad according to this embodiment comprises four coils 2, 3, 3a and 3b with a quadrature coil 12. If the four circular coils 2, 3, 3a and 3b are thought of as each having a centre collectively defining the vertices of a square, diagonally opposing coils of the square abut each other without overlapping to form two orthogonal DDP pairs (as described above with respect to FIGS. 1 and 2) operating as dipoles. Each coil of the DDP pairs overlaps both the coils of the orthogonal DDP pair, and the two DDP pairs are accordingly mutually decoupled. The quadrature coil 12 is also mutually decoupled from both of the DDP pairs. As a primary structure the DDP pairs and the quadrature coil are all independent and may also be operated with different magnitude, phase or frequency without interfering with each other, to shape the field as required. As a secondary structure the DDP or quadrature coils can be separately tuned at different or similar frequencies and power can be extracted as and when desired based on the application.

In one possible mode of operation of the embodiments of FIG. 12, the DDP pairs may be operated in phase with each other, generating a stationary time varying magnetic field. In another mode, one pair of diagonally opposing DDP coils may be energised out of phase with the other pair. In yet another mode, only one DDP may be energised. In yet further modes, the quadrature coil 12 may be energised simultaneously with either or both of the DDP pairs. The mode of operation and, where appropriate, coils energised are preferably chosen to produce a field most effectively received by a pickup. The IPT system is preferably capable of switching between any such mode as required to operate in the most efficient way, but may be limited to a single mode or a selection of modes to simplify the power supply design and/or control.

FIGS. 12(c)-(e) show further variations of the embodiments of FIGS. 12(a) and (b). The embodiment of FIG. 12(c) omits the quadrature coil. FIG. 12(d) illustrates that the coils of each DDP pair need not necessarily be the same size, yet are still capable of being mutually decoupled. A quadrature coil 12 can also be added to this embodiment as shown in FIG. 12(e). Because the DDP pairs of coils are operated as dipoles, the quadrature coil 12 is mutually decoupled from both DDP pairs in this embodiment.

While the coils of an IPT pad according to various embodiments of the present invention are ideally completely decoupled from one another, some nominal coupling may be inevitable. The IPT pad of FIG. 4(b), with the dimensions listed in Table A4, under testing was shown to have an optimum mutual coupling or coupling coefficient k of 0.15% between coils 2 and 3, and 0.08% between coils 2 and 3a, for example. However, any significant mutual coupling between coils will severely impact the efficiency of the system and the mutual coupling should ideally be as close to zero as practically possible. It should be noted that the mutual coupling measured between coils will generally increase under load or in the presence of an external ferrite material. An IPT pad according to the present invention is thus preferably designed to have a mutual coupling of less than about 10% in the absence of a load or external ferrite material, and more particularly less than about 2% or even 1%. For the purpose of the description and claims, the phrases "mutually decoupled", "no mutual coupling" and the like are intended to encompass such mutual couplings.

For such apparatuses to have coils which are mutually decoupled requires proper spacing of the coils relative to each other so that the flux generated from one device enters and exits in approximately equal proportion with neighbouring coils in the primary (or secondary), wherein the net flux through neighbouring coils is approximately zero.

Nevertheless, a higher level of coupling between the coils, such as up to about 20%, may be acceptable in at least some applications without departing from the scope of the invention. Even higher levels of mutual decoupling may be tolerable for some applications, in particular where the spacing between the primary and secondary pads is low. FIGS. 13 and 14 show embodiments of the invention in which there may be a low level of mutual coupling, of up to about 20% for example.

FIGS. 13(a)-13(e) show embodiments comprising further variations of the three-coil IPT pad of FIG. 4.

The IPT pad of FIG. 13(a) further comprises a further coil 13 which is not ideally mutually decoupled, in this case entirely encircling coils 2, 3 and 3a. The further coil 13 in this embodiment is preferably disposed such that its centre or pole is substantially central with respect to coils 2, 3 and 3a which are, preferably, mutually decoupled from one another. Although the central coil 13 in this embodiment encircles the other coils, in other embodiments the substantially central coil 13 may circumscribe or partially overlap the three or more other coils, as described below.

As the central coil 13 encircles or partially overlaps all of the other coils, it will not be mutually decoupled from those coils in all possible modes of operation. In particular, the central coil 13 of FIG. 13(a) will be substantially mutually decoupled from coils 2, 3 and 3a when all three of those coils are energised, but will not typically be mutually decoupled when only coils 2 and 3 are energised, for example, The IPT pad of FIG. 13(a) also omits the core or ferrite strips 5 of the embodiment of FIG. 4. The square shape of the plate 7 can also be seen to differ from the triangular plate 7 of FIG. 4 to accommodate the central coil 13.

The embodiment of FIG. 13(b) is similar to that of FIG. 13(a), but comprises a lattice or grid of substantially orthogonal ferrite strips 5. It will be apparent that the ferrite strips 5 thus need not necessarily extend parallel to imaginary lines between the centres of coils 2, 3 and 3a as shown in FIG. 4. As previously described, the core may alternatively comprise a sheet of ferrite material.

The embodiment of FIG. 13(c) comprises a further modification with respect to FIG. 13(b), in that the ferrite strips 5 extend beyond the outer circumference of central coil 13. If the ferrite strips 5 terminate within the central coil 13 then the field will radiate, and the elongated ferrite strips 5 of this embodiment will thus generally be preferred.

FIGS. 13(d) and 13(e) show further variations of the three-coil pad of FIG. 4, further comprising a central coil 13 which partially encircles coils 2, 3 and 3a. FIG. 13(d) shows an embodiment of an IPT pad without ferrite strips 5, while FIG. 13(e) comprises a lattice of ferrite strips 5 extending to, or slightly beyond, the outer circumference of coils 2, 3 and 3a.

FIGS. 14(a) to 14(d) illustrate some sub-optimal variations of the three-coil embodiments of FIG. 4, by way of example. In these embodiments, the coils 2, 3 and 3a do not overlap, and will therefore have mutual coupling.

In the case where the multi-coil structure of the present invention is used as a secondary pad to receive power, ideally the coils will all be mutually decoupled from each other to ensure that each coil can be easily tuned to receive power at a selected frequency, and that power transfer is maximised. Under such conditions, when a coil is not receiving power it can be switched off without impacting the operation of the other coils, to reduce any operating loss. Nevertheless, if the secondary coils are not perfectly mutually coupled (independent), then provided the operating circuit tuning Q (reactance of the coil divided by the load of the circuit) is low, then nominal tuning can be achieved and operation can still arise despite there being some mutual coupling between neighbouring coils. Such coils can also be switched out and while this may slightly impact the power transfer in adjacent coils, this can be compensated for by operation of the primary ground coils increasing or decreasing its driving VA or by adjusting a secondary regulator to modify the power to the load.

In a further embodiment of the present invention comprising three or more mutually decoupled coils, it may in some applications be desirable to tune one or more of the various coils to different frequencies to enable coupled operation with secondary devices which have different tunings. For example, for high power transfer some of the coils may be designed and tuned for operation at 40 kHz while others may be tuned at 80 kHz, enabling coupling to different magnetic structures at different tuned frequencies. Alternatively, for lower power transfer some coils may be tuned at 800 MHz while others may be tuned to 2.4 GHz (both unlicensed bands) to achieve the same for smaller appliances or mobile consumer electronics devices, for example.

TABLE A1

| Dimensions of the BPP | |
|---|---|
| Common Dimensions | |
| Winding width | 80 mm |
| Ferrite spacing | 32 mm |
| Ferrite width | 28 mm |
| Y coil spacing | 50 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Variations based on number of ferrites | |
| A: BBP6: using 6 ferrite slabs to make each ferrite strip | |
| (BPP6) Ferrite length | 558 mm |
| (BBP6) Overlap | 156 mm |
| X coil spacing | 10 mm |
| X padding | 10 mm |
| B: BBP8: using 8 ferrite slabs to make each ferrite strip | |
| Ferrite length | 774 mm |
| Overlap | 74 mm |
| X coil spacing | −83 mm (− represents an overlap) |

TABLE A1-continued

Dimensions of the BPP

| | |
|---|---|
| X padding | 10 mm |
| C: BBP10: using 10 ferrite slabs to make each ferrite strip | |
| Ferrite length | 930 mm |
| Overlap | 39 mm |
| X coil spacing | −174 mm (− represents an overlap) |
| X padding | 110 mm (nb: 200 mm added overall to padding to fit extra ferrites) |

TABLE A2

Dimensions of the DDP

| | |
|---|---|
| Winding width | 80 mm |
| Inner winding width | 120 mm |
| Ferrite spacing | 32 mm |
| Ferrite width | 28 mm |
| Y coil spacing | 10 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Ferrite length | 558 mm |
| X coil spacing | 10 mm |
| X padding | 10 mm |

TABLE A3

Dimensions of the DDQP

| | |
|---|---|
| Winding width | 80 mm |
| Inner winding width | 120 mm |
| Ferrite spacing | 32 mm |
| Ferrite width | 28 mm |
| Y coil spacing | 10 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Ferrite length | 558 mm |
| X coil spacing | 10 mm |
| X padding | 10 mm |
| Quadrature coil length | 534 mm |

TABLE A4

Dimensions of the IPT Pad of FIG. 12

| | |
|---|---|
| Ferrite length | 520 mm |
| Ferrite width | 28 mm |
| Ferrite height | 16 mm |
| Each side of the equilateral triangle formed by ferrite structure | 200 mm |
| Inner diameter of each coil | 130 mm |
| Outer diameter of each coil | 150 mm |
| Optimum distance from centre point of one coil to the other | 172 mm |
| Mutual coupling k between coils 2 and 3 | 0.15% |
| Mutual coupling k between coils 2 and 3a | 0.08% |

While the invention has been described primarily with reference to applications in powering or charging electric vehicles, it is to be noted that the invention has application to inductive power transfer in general, and may therefore be applied in a range of industrial or consumer applications including, but not limited to, wirelessly powering or charging high- or low-power appliances or consumer electronics such as mobile telephones, computer devices, and/or computer peripherals. By way of example with reference to a human interface device (HID), a primary magnetic flux pad according to the present invention may be provided in a mouse pad to power or charge a wireless mouse, or may be integrated in the mouse to receive power from a known primary pad.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention.

The invention claimed is:

1. A method, comprising:
    selecting at least one power transfer regime from among a plurality of power transfer regimes, wherein the at least one of the plurality of inductive power transfer regimes comprises a power transfer regime in which a subset of coils of a three-coil inductive power transfer primary are deactivated, and power is transferred to an inductive power pickup with one or more coils of the three-coil inductive power transfer primary that are not deactivated; and
    inductively transferring power to the inductive power pickup in accordance with the selected inductive power transfer regime,
    wherein the three-coil inductive power transfer primary comprises:
    a plate;
    a ferrite core disposed above the plate; and
    three coils of the three-coil inductive power transfer primary arranged above the ferrite core and partially overlapping each other such that respective centers of the three coils are spaced substantially equidistantly from one another in a triangular arrangement,
    wherein the ferrite core comprises a plurality of ferrite bars arranged parallel to imaginary lines passing through the respective centers of the three coils such that the plurality of ferrite bars extend substantially parallel to respective axes extending between the respective centers of respective pairs of the three coils, and the plurality of ferrite bars are arranged in a single layer such that pairs of the ferrite bars intersect one another on the single layer.

2. The method of claim 1, wherein inductively transferring power to the inductive power pickup comprises:

inductively transferring power, from the three-coil inductive power transfer primary to the inductive power pickup, via at least two coils that are operated concurrently and in-phase.

3. The method of claim 1, wherein the method further comprises:
sensing an electric vehicle relative to the three-coil inductive power transfer primary from a change in mutual coupling between two or more coils of the three-coil inductive power transfer primary; and
inductively transferring power, from at least one of the two or more coil of the three-coil inductive power transfer primary to the inductive power pickup of an electric vehicle.

4. The method of claim 3, further comprising:
providing current with a first phase to a first coil of the two or more coils, and
providing current with a second phase to a second coil of the two or more coils,
wherein the first current and the second current are synchronized to produce a phase difference of about 90° between the first phase and the second phase.

5. The method of claim 1, wherein the method comprises transferring power, from the three-coil inductive power transfer primary to the inductive power pickup, via a plurality of coils of the three-coil inductive power transfer primary, and steering the overall magnetic field created by the three-coil inductive power transfer primary, to accommodate for misalignment of the inductive power pickup with the three-coil inductive power transfer primary, by controlling the relative current in each of the plurality of coils of the three-coil inductive power transfer primary.

6. The method of claim 1, wherein the method comprises operating a pair of coils of the three-coil inductive power transfer primary to transfer power to the inductive power pickup, and operating the coils of the pair of coils 180° out of phase.

7. The method of claim 1, wherein the at least one of the plurality of inductive power transfer regimes comprises synchronizing at least two coils of the plurality of coils of the three-coil inductive power transfer primary to produce a magnetic field with a spatially sliding motion between the poles of the at least two coils.

8. The method of claim 7, wherein the method comprises synchronizing the at least two coils to produce a first magnetic field with a first coil of the at least two coils that is 90° out of phase with a second magnetic field produced by a second coil of the at least two coils.

9. The method of claim 1, wherein selecting at least one power transfer regime from among the plurality of power transfer regimes comprises estimating, from a load on each of the plurality of coils, the level of coupling between the respective coil and the inductive power pickup, and selecting the power transfer regime that causes the greatest coupling between the multi-coil inductive power transfer primary and the inductive power pickup.

10. A magnetic flux pad for generating magnetic flux, the magnetic flux pad being configured to be operable in a plurality of modes so as to control the magnetic flux generated thereby, the magnetic flux pad comprising:
a plate;
a ferrite core disposed above the plate; and
three coils arranged above the ferrite core and partially overlapping each other such that respective centers of the three coils are spaced substantially equidistantly from one another in a triangular arrangement, the three coils being capable of being selectively energized to enable said control to be effected,
wherein the ferrite core comprises ferrite bars arranged parallel to imaginary lines passing through the respective centers of the three coils such that the ferrite bars extend substantially parallel with respective axes extending between the respective centers of respective pairs of the three coils, and the ferrite bars are arranged in a single layer such that pairs of the ferrite bars intersect one another on the single layer.

11. The magnetic flux pad of claim 10, wherein ferrite bars comprise multiple ferrite bars parallel with one another and parallel to imaginary lines passing through the respective centers of the three coils.

12. The magnetic flux pad of claim 10, wherein the plurality of modes comprises at least two of:
single-phase modes, wherein one or more of the three coils are energised in phase with each other;
two-phase modes, wherein one or more of the three coils are simultaneously energised out of phase with one or more other coils; and
a multiphase mode, wherein the three coils are simultaneously energised out of phase with each other.

13. The magnetic flux pad of claim 10, wherein the plate has a shape that substantially matches the predetermined geometric pattern of the plurality of ferrite bars.

14. The magnetic flux pad of claim 10, wherein the plate has a shape that substantially matches an outer perimeter of the three coils.

15. The magnetic flux pad of claim 10, wherein ends of the plurality of ferrite bars extend beyond an outer perimeter of the three coils.

16. A magnetic flux pad for generating magnetic flux, the magnetic flux pad being configured to be operable in a plurality of modes so as to control the magnetic flux generated thereby, the magnetic flux pad comprising:
a plate;
a ferrite core disposed above the plate, the ferrite core comprising a plurality of individual ferrite bars arranged in a predetermined triangular shape; and
three coils arranged above the ferrite core and partially overlapping each other such that respective centers of the three coils are spaced substantially equidistantly from one another, the three coils being capable of being selectively energized to enable said control to be effected,
wherein respective centers of the three coils are respectively arranged over intersections of pairs of the plurality of individual ferrite bars, and
wherein the individual ferrite bars are arranged parallel to imaginary lines passing through the respective centers of the three coils such that the individual ferrite bars extend substantially parallel with an respective axes extending between the respective centers of respective pairs of the three coils, and the individual ferrite bars are arranged in a single layer such that pairs of the ferrite bars intersect one another on the single layer.

17. The magnetic flux pad of claim 16, wherein the plurality of modes comprises at least two of:
single-phase modes, wherein one or more of the three coils are energised in phase with each other;
two-phase modes, wherein one or more of the three coils are simultaneously energised out of phase with one or more other coils; and
a multiphase mode, wherein the three coils are simultaneously energised out of phase with each other.

18. The magnetic flux pad of claim 16, wherein the plate has a shape that substantially matches the predetermined triangular shape.

19. The magnetic flux pad of claim 16, wherein the plate has a shape that substantially matches an outer perimeter of the three coils.

20. The magnetic flux pad of claim 16, wherein the ends of the plurality of individual ferrite bars extend beyond an outer perimeter of the three coils.

* * * * *